May 29, 1923.
A. G. WAGNER
1,457,199
TRANSMISSION GEAR SHIFTING MECHANISM
Filed June 30, 1921   4 Sheets-Sheet 1
Fig. 2.
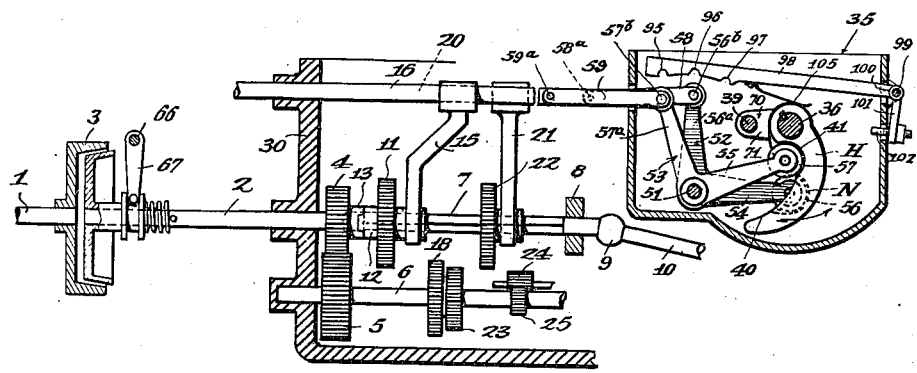
Fig. 16.
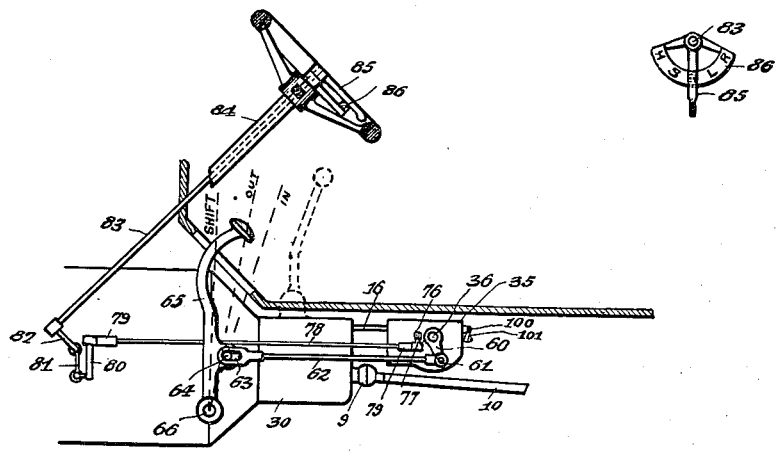
Fig. 1
Inventor
Albert G. Wagner
By Wood & Wood
Attorneys May 29, 1923.
A. G. WAGNER
1,457,199
TRANSMISSION GEAR SHIFTING MECHANISM
Filed June 30, 1921
4 Sheets-Sheet 2
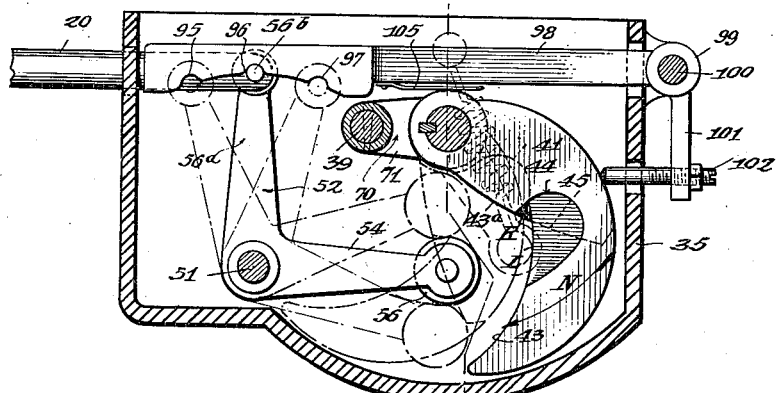
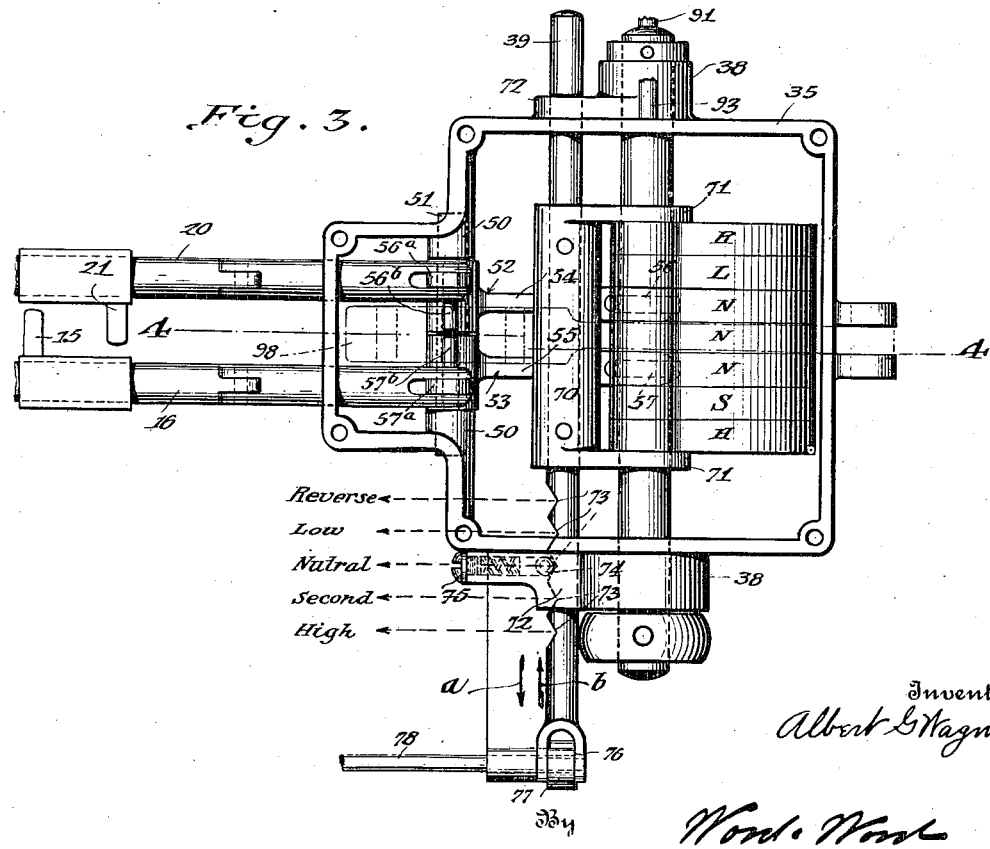

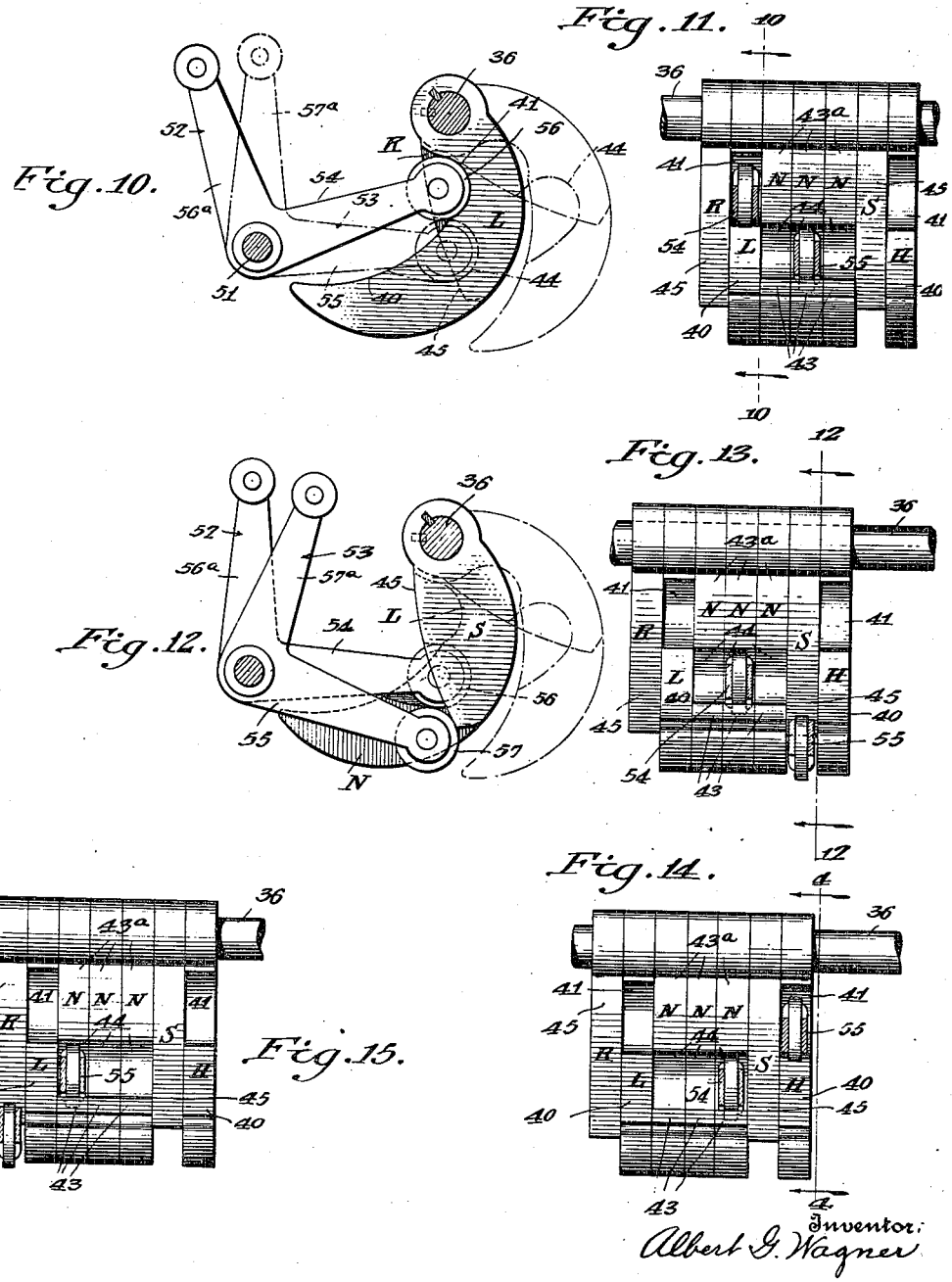

Patented May 29, 1923.

1,457,199

UNITED STATES PATENT OFFICE.

ALBERT G. WAGNER, OF NORWOOD, OHIO, ASSIGNOR OF TWO-EIGHTHS TO HENRY A. MEYER, TWO-EIGHTHS TO FELIX ELSBACH, AND TWO-EIGHTHS TO JACOB BLOCH, ALL OF CINCINNATI, OHIO.

TRANSMISSION-GEAR-SHIFTING MECHANISM.

Application filed June 30, 1921. Serial No. 481,624.

*To all whom it may concern:*

Be it known that I, ALBERT G. WAGNER, a citizen of the United States, and residing at Norwood, in the county of Hamilton and State of Ohio, have invented a new and useful Improvement in Transmission-Gear-Shifting Mechanism, of which the following specification is a full disclosure.

This invention relates to transmission gear shifting mechanism as applied particularly to automobiles, and has for one of its objects the elimination of the shifting handle now in use to operate the selective transmission gearing.

Another object is the provision of positive means, mounted upon the steering column, and readily accessible to the operator, for selectively positioning an auxiliary shifter member preparatory to a gear shifting operation.

Another object is the provision of means operable by the clutch pedal for shifting the gears, after a selective setting of an auxiliary shifter member.

An additional object is the provision of a compact and positively acting selective shift mechanism which is capable of operative attachment with any form of transmission gearing.

Another object is the provision of a "foolproof" selective gear shift structure wherein the gears can only be shifted when the clutch is out, and after having been first set to neutral position.

Another object is the production of a simple mechanism of little weight, which may be very cheaply manufactured.

Other objects and certain advantages will be disclosed in the description of the drawings, forming a part of this specification, and reference is made to said drawings, in which:

Fig. 1 is an elevation showing my invention in operative relation with an ordinary type of selective gear transmission mechanism.

Fig. 2 is a longitudinal vertical section of the structure of Fig. 1.

Fig. 3 is a plan view of my improved selective gear shift mechanism.

Fig. 4 is a longitudinal vertical section on line 4, 4, of Fig. 3.

Fig. 10 is a diagrammatic view on line 10, 10, of Fig. 11, showing the position of the cam block at the end of a setting operation, corresponding to a gear shift to "low."

Fig. 11 is an inner face view of the cam block showing the relation of the levers to the L and N cams also corresponding to a gear shift to "low."

Figs. 12 and 13 are views similar to Figs. 10 and 11, showing the parts positioned corresponding to a gear shift to "second."

Fig. 14 is a view similar to Figs. 11 and 13, showing the cams positioned corresponding to a gear shift to "high" as in Fig. 2.

Fig. 15 is a view similar to Fig. 14 corresponding to a gear shift to "reverse."

Fig. 16 is a plan of the set lever sector.

Figures 7, 8, 9:
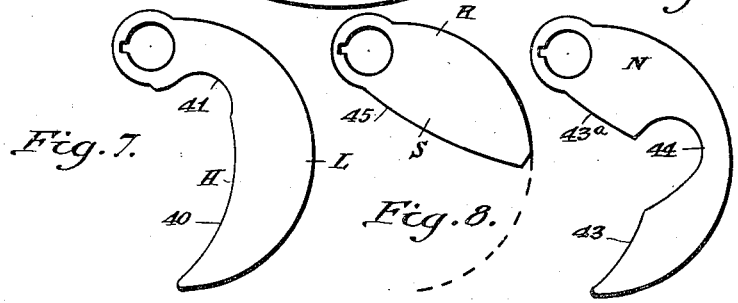
Figs. 7, 8 and 9 are detail face views respectively of the "high" and "low," "reverse" and "second," and "neutral" cam fingers.
Figure 5:
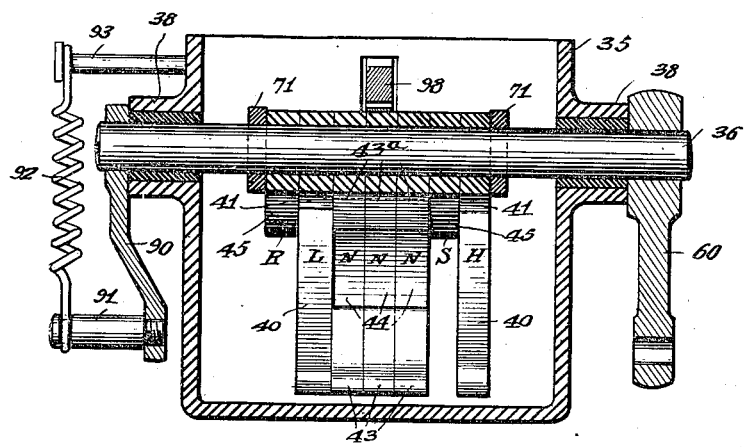
Fig. 5 is a transverse vertical section on line 5, 5, of Fig. 4.

As shown in Fig. 5 there are seven cam fingers, those designated N being of similar configuration and being consecutively placed centrally of the shaft, and of the cam combination. As viewed in Fig. 5, the finger L lies adjacent the left finger of the series of fingers N, and the finger S at the right of said series, while the fingers R and H lie respectively at the left and right extremities of cam combination. The fingers R and S are of similar configuration, while the fingers L and H are similar. The configuration of the fingers are well shown in Figs. 7 to 9 inclusive.

My selective shifting mechanism is shown in conjunction with an ordinary type of transmission gearing, the type herein shown, being designed for four shift combinations, three forward and one reverse.

Although I have illustrated herein a four phase selective gear transmission mechanism, it will be readily evident that the principles thereof may be applied in structures for the operation of any selective form of transmission gearing.

The numerals 1 and 2 designate respectively the engine and clutch shafts, designed to be suitably connected through the medium of a clutch 3, of any preferred form operated by a pedal, which also functions to operate or shift the transmission gearing conformably to the setting of my selective mechanism, all hereinafter more fully described. Fixed to the clutch shaft 2 within the gear casing is a spur gear 4, meshing with a similar gear 5 fixed to the counter or idler shaft 6, parallel to the shaft 2. The gears 4 and 5 are in constant mesh so that the shaft 6 constantly revolves when the clutch 3 connects the shaft 2 with the engine shaft 1.

Stepped for rotation within a cavity of the clutch shaft 2, and forming an independently rotatable extension of the said shaft, is a square shaft 7, rotatable in a bearing 8, and flexibly connected as at 9 to the rear drive shaft 10. Slidably mounted upon the squared shaft 7, is a gear 11 carrying a toothed clutch member 12, designed to co-operate with a companion clutch member 13 of the gear 4, to connect the shafts 3 and 7 for unitary rotation (see Fig. 2). The hub of the sliding gear 11, is rotatively engaged with the fork of an arm 15 rigidly attached to a shifting bar 16 mounted slidably in the transmission casing. As shown in Fig. 2 the gears are in "high," and the shaft 2 is directly connected with the shaft 7. The shifting bar 16 is capable of movement in two directions and when thrown to its right limit, (Fig. 2), will bring the gear 11 into mesh with the gear 18, at which time the clutch 12 will be released from its companion member 13, and the gears will be in "second".

Mounted parallel with the shifting bar 16 is the usual second similar bar 20 (Fig. 3) carrying an arm 21, its forked end being loosely engaged with the hub extension of the gear 22, also slidable upon the shaft 7. The bar 20 when moved to its left limit, (Fig. 2), will mesh with the gear 23 attached to the shaft 6, at which time the gears will be in "low." When the bar 20 is thrown to the right limit, the gear 22 will mesh with an intermediate idler gear 24, meshing with a gear 25 upon the shaft 6, at which time the gears will be in "reverse."

The above described gear structure per se is not of my invention, but represents one type of transmission gearing operable through the means of my improved selector.

I will now proceed to a description of my selector mechanism, as attached to operate the above type of shiftable transmission gearing.

As shown in Figure 1, my mechanism can be placed directly in the rear of the transmission gear-box 30, suitable link connections being made between it and the bars 16 and 20.

A casing 35 encloses my selective shift mechanism, a rotatable shaft 36 being held in suitable bearing 38 therein. Adjacent the shaft 36, parallel thereto, and in the same horizontal plane therewith, is slidably mounted a selector shaft 39 of smaller diameter than the shaft 36.

Upon the shaft 36 are splined a series of arcuate cam fingers, respectively designated R, L, N, S and H, these initials corresponding to the words "reverse," "low," "neutral," "second," and "high."

The fingers H and L are each provided with a curved cam surface 40 designed to raise the arm of that bell crank lever with which it is aligned, when the multiple cam block is swung forwardly. The surface 40 merges into a pocket 41, designed to engage and limit the bell crank lever arm in its uppermost positions. The three fingers N are of similar configuration, and are each provided with two cam surfaces 43, 43$^a$, both merging into a common centrally located arcuate slot 44, the axes of the pocket 41 and slot 44 being concentric with the axis of the shaft 36, upon which shaft, the fingers, en bloc, are capable of lateral sliding motion. The surfaces 43, 43$^a$, of the cam fingers N act respectively to raise or to lower the arm of any bell crank lever in alignment therewith and to bring the same to neutral position to be engaged by and held in such position by the slot 44. The two fingers R are of similar curvature and each provides the cam surface 45, designed to lower the arm of any bell crank lever aligned therewith. The surfaces 40, 43 are of similar curvature, and the surfaces 45 and 43$^a$ are likewise similar, so that when the fingers are placed together upon the shaft, these surfaces are transversely aligned. The fingers may be cast separately, as here shown, and afterwards brazed together, or the combination of cam surfaces and pockets may be cast in a single piece, it being obvious that either construction would be efficient.

Mounted within bearings 50 near the lower portion of the casing 35 is a shaft 51 having loosely mounted thereon at its middle, two bell-crank levers 52, 53, the lower horizontal arms 54, 55 of which, are spaced so that their outer ends normally lie vertically below the two outermost cam fingers N. The upper arms 56$^a$ and 57$^a$ of the bell cranks are pivoted by pins 56$^b$ and 57$^b$ to links 58 and 59, in turn pivoted as at 58$^a$ and 59$^a$, respectively to the shifting bars 20 and 16.

By this construction the bars 20 and 16 through the medium of the bell crank levers are capable of being separately and se'ectively moved to limits of movement in either direction and returned to initial position by the cam fingers. Rollers 56, 57, are provided at the ends of the arms 54, 55, and the same are adapted to engage any selected cam surface and to subsequently enter the pockets 41 or 44, to limit the lever movement conformably to the selective positioning of the cam fingers.

As shown in Figs. 3 and 4, the fingers are in a position corresponding to "neutral."

The shaft 36 is provided with a crank arm 60, its outer end being pivoted as at 61 (see Fig. 1) to a link 62, extending forwardly to and having a slotted connection 63 with a pin 64, carried by the shift lever 65, in operative connection with the clutch 3, through shaft 66 and arm 67.

As shown in Figs. 1 and 2, the extreme forward movement of the shift lever has caused the cam finger H to engage the bell crank lever 53 and to throw it upwardly, sliding the bar 16 and causing the clutch members 12 and 13 to engage to put the gears in "high." It will be noticed that there is no movement of the link 62 until the clutch 2 is disconnected, the pin 64 riding forwardly in the slot 63 and only engaging the opposite end of the slot to operate the fingers and to make the shift when the clutch 2 is fully released.

The lateral spacing of the arms 54, 55, relative to the widths of the cam fingers is such that one of the arms will always be engaged with an N finger before the shift is completed, thus avoiding the possibility of the shift of both rods 16, 20, since one bellcrank is always held in neutral.

The selector shaft 39 traverses and is non-rotatably attached to a yoke 70, between the arms 71 of which the ensemble of cam fingers lie, the shaft 36 rotatably traversing said arms, and the yoke acting to shift the cam combination laterally.

As before stated, the series of cam fingers are bodily movable laterally upon the shaft 36, but are keyed to rotate with said shaft.

The selector shaft is slidable within bearings 72, and is provided at one end with a series of notches 73, in this instance, five in number, the notches (Fig. 3) corresponding to five possible gear selections, including "neutral." Any one of these notches is engageable with a spring pressed plunger 74, held in a suitable housing by a screw cap 75. The selector shaft may be moved laterally in either direction against the friction of the plunger with the notches 73 to correspondingly move any alternate pair of selector fingers into alignment with the arms of the bell-crank levers, for the desired shift of gears. The movement of the selector rod may be made through the means of any preferred mechanism, but I have shown the end of the rod forked at 76 and pivoted to an arm 77 attached to a horizontal rotatable rod 78, held in suitable bearings 79. At its forward end, the rod 78 has a downwardly directed lever arm 80 flexibly attached as at 81 to the arm 82 of shaft 83 mounted to rotate within the steering column 84. To the upper end of the shaft 83 is attached a set lever 85, sliding over a sector 86, suitably marked upon its upper face with selective graduations or letters. It is obvious that the set lever can be operated to laterally move selector shaft 39 and cam fingers to the desired shift position.

When the selector rod is moved one or two notches in either direction from its position shown in Fig. 3, the cam block is correspondingly moved and set for any one of the four speeds. For instance, when the selector rod is moved one notch in the direction of the arrow $a$, the cam L is aligned with the bell crank lever arm 54, while the arm 53 underlies the middlemost cam finger N, see Figs. 10 and 11. In this position, the surface of the cam L, upon rotation of the cam block will coact with the roller 56, of the lever 52, to raise the arm 54 of the lever to operate the shift rod 20 and throw the gear 22 into mesh with the gear 23, or "low," the arm 53 being held in neutral position by the finger N.

Figures 2 and 14 show the position of the parts when the selector rod has been moved two notches in the direction of the arrow $b$, and when the cam block has been rotated to shift the gears to "high." The fingers L and H are of similar configuration but are operatively connected with different shift rods.

After the selected shift has been made, the shift or clutch lever 3 is released and the pin traveling to the opposite end of the slot 63 forces the cam block rearwardly to its initial position before the clutch is let in, leaving the bell crank levers in their set positions, and held so set by a spring latch hereinafter described.

Figure 6:
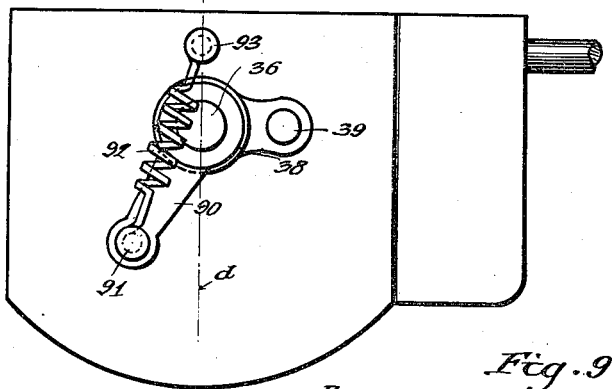
Fig. 6 is a side elevation of the casing showing the spring latch construction.

The shaft 36 is rotated in each direction against the action of a spring latch, designed to hold the shaft and cam fingers thereon, at their limits of movement. Upon the outer end of the shaft 36 beyond the bearing 38 is rigidly attached an arm 90, carrying an outstanding pin 91, to which is fastened one end of a spring 92, of less power than the clutch spring, the opposite end of which is attached to an outstanding pin 93 of the casing 35. The action of the latch is well known, it being obvious that the spring will tend to prevent displacement of the arm 90 at either side of the center line $d$, see Fig. 6.

Any preferred means may be employed for holding the rods 16 and 20 to prevent their accidental displacement, but I have invented and herein shown, a locking means automatically operable by cam movement to securely hold the bell crank levers in any of their set positions.

The pins 56$^b$ and 57$^b$ are extended laterally and equally towards one another, without touching, between the arms 56$^a$ and 57$^a$, (see Fig. 3), and are engageable with any one of the notches 95, 96, and 97, of a lever 98, disposed above the mechanism, the hub 99 of the said lever being pivoted as at 100 to the casing 35. Dependingly and rigidly attached to the hub 99 is an arm 101 traversed near its bottom by a set screw 102, the end of which is designed to be engaged by the rear surface of the block, to force the notches of the lever 98 into engagement with the pins 56$^b$ or 57$^b$, whatever their position, against the action of spring 105 compressively engaged against the upper surfaces of the cam hubs. When the cams move forwardly as shown in Fig. 2, the spring 105 immediately throws the lever upwardly, (see Fig. 2), to free the pins 56$^b$ and 57$^b$, thus allowing the bell cranks to be moved to other positions, by the time that the cam fingers engage with the levers.

I will now describe the complete operation of my selective shift mechanism, following the usual practice of shifting consecutively from "low" to "second," "second" to "high," as when getting under way.

The initial position of the mechanism is shown in Figs. 3 and 4, in which position the toothed clutch member 12 is disengaged from its companion member 13, the gear 11 lies in its midposition, relative to gears 5 and 18, thus putting the transmission gears in "neutral," the clutch lever 65 being at the position marked "In" (see Fig. 1), and shafts 1 and 2 being coupled. A selective lateral shift of the cam fingers, en bloc, is now made through the medium of the set-lever 85, to bring the cam L in alignment with the arm 54, of lever 52, connected to shift bar 20, and to also bring the middlemost cam finger N in alignment with the arm 55 of the lever 53. When the cam fingers are thus set, the clutch lever is thrown forward to a positon marked "Shift," the clutch 3 being released before a shift of gears is made, the first part of the forward movement of the clutch lever accomplishing that result. The result of this clutch lever shift is to swing the selected cam fingers forwardly to engage the lever arm 54 and to throw it to a position shown in Fig. 10, the slot 44 of the finger N engaging the lever arm 55 to hold the same in neutral position. The shift puts the gear 22 in mesh with gear 23, and the gears are then in "low." The shift lever is now released, and in its rearward movement the pin 64 engaging the rear of the slot 63, forces the arm 60 rearwardly to return the cam fingers to their initial positions, as shown in dot and dash lines in Fig. 12, leaving the bell cranks set and locked in the positions shown in Fig. 10. The cam fingers are now freely movable laterally in either direction, and the set lever is moved to slide the cams to positions shown in Fig. 13, corresponding to the shift for "second." As the clutch lever moves forwardly, after the clutch 3 is disengaged, and as the cam block moves forwardly the surface 43$^a$ of the N cam engages the arm 54 and returns it to its mid-position, thus returning the gear 22 to its initial position which movement is accomplished before the arm 55 begins to move under the influence of the cam S, to lower the said arm, through its connection with the bar 16 to bring gear 11 into mesh with the gear 18 or "second." The cam fingers are again returned to their initial position by releasing the clutch pedal and the set lever is operated again to move the cam fingers to positions, shown in Fig. 14, to bring the H cam over the arm 55, and to bring the left N cam over the arm 54, as the shift lever is again thrown forwardly, the N cam raises the lever arm 55, from its positions, shown in Fig. 12, to a position shown in Fig. 2, disengaging the gear 11 from the gear 18, and putting the clutch 12 in engagement with its companion clutch 13, the gears thus being in "high."

The mechanism above described has been found to operate positively and with greatest ease, enabling the operator to select his shift, and to shift the gears without possibility of error.

Having described my invention, I claim:

1. In a gear shifting mechanism, the combination with a gear shifter bar, of a lever connected to said bar, a series of cams swinging as a unit, formed to respectively, raise, lower and centralize said lever relative to its upper and lower limits of movement, and means for selectively engaging said cams with said lever.

2. In a gear shifting mechanism, a gear shifter bar, a lever connected to said bar, a series of cams swinging as a unit, adapted to respectively actuate said lever in relative alternate directions from a lever normal position, and for normalizing the lever, and means for selectively positioning said cam for lever cooperation.

3. In a gear shifter mechanism, the combination with a gear shifter bar, of a lever connected to said bar, a series of cams swinging to actuate said lever and formed to respectively raise, lower and centralize said lever relative to its extremes of movements, means for locking said lever in its adjusted position, and manually controlled means for selectively positioning said cams for engagement with said lever.

4. In a gear shifter mechanism, a gear shifter bar, a lever connecting with said bar for reciprocating the same, a series of cams swinging to respectively actuate said lever in relative alternate stroke directions and to centralize the same, a lock member for locking said lever in its adjusted position, and means for shifting said cams for selectively bringing the same into cooperative position with said lever.

5. In a gear shifting mechanism, gear shifting bars, levers respectively connected to said bars for actuating the same, a swinging member for actuating said levers, having cam surfaces selectively cooperating with said levers for different lever motion actuation, and means for shifting said member for selectively bringing the cam surfaces into cooperative position with said levers.

6. In a gear shifting mechanism, the combination with selective gear shifting bars, of bell-crank levers, connected respectively with said bars and spaced apart and mounted to swing on a common axis, a multiple cam member, capable of lateral motion across the free ends of said levers and provided with cam faces for respectively selectively raising, lowering and centralizing said levers, separately and simultaneously and means for swingingly engaging said selectively positioned faces with their respective levers.

7. In a gear shifting mechanism, the combination with selective gear shifting bars of bell crank levers connected respectively with said bars, a series of cam fingers laterally translatable across the free ends of said levers, said cam fingers providing means for raising, lowering and centralizing said levers, manually operated means for laterally shifting said cam members with respect to said levers and means operable by a clutch pedal for engaging said cams with said levers.

8. In a gear shifting mechanism, the combination with gear shifting bars, of levers connected to said bars, a cam element providing cam surfaces for respectively raising, lowering and centralizing said levers, means for positioning said cam surfaces selectively with respect to said levers, means for engaging said cams with said levers for actuating the same, and automatic means for locking said levers in their selected positions.

9. In a gear shifting mechanism, the combination with gear shifting bars, of levers connected to said bars, a cam element, providing cam surfaces for respectively raising, lowering and centralizing said levers, means for positioning said cam surfaces selectively with respect to said levers, means for engaging said cams with said levers for actuating the same, automatic means for locking said levers in their selected positions, said means comprising a pivoted lever having notches at one extremity, engageable with projections carried by said levers, and an adjustable pin mounted upon the opposite arm of said lever engageable by said cams for actuating said lever.

10. In a device of the character described a sliding gear speed change transmission gearing, a driven shaft, a clutch and controlling treadle therefor, for connecting and disconnecting said shaft and gearing, a shifter member actuated by said clutch controlling treadle for sliding and controlling the sliding gear of said transmission gearing, having cams for imparting respective definite gear speed change sliding motions, connector means for said sliding gears and shifter member, said shifter being translatable for selectively bringing said cams into cooperation with said connector means, and means controlled by said cams for automatically locking said connector means.

11. A device of the character described, comprising clutch controlling means, gear shifting members, a rock shaft actuated by said clutch controlling means, a member splined upon said shaft, having a series of cam surfaces for respectively actuating said gear shifting members, each cam surface adapted to actuate a gear shifting member in cooperative position therewith from any preset position to a selected reset position, and means for sliding said members upon said shaft for selectively bringing the cam surfaces into cooperative position with said gear shifting members.

12. In a gear shifting mechanism, the combination with gear shifting means, of a shifting member moving as a unit, said shifter member provided with a series of inclined surfaces, each alternate surface oppositely inclined to the adjacent surface, said inclined surfaces coacting with said gear shifting means for imparting respective, definite gear speed changes, said shifter member being translatable for selectively bringing said inclined surfaces into cooperation with said gear shifting means.

In witness whereof, I hereunto subscribe my name, as attested by the two subscribing witnesses.

ALBERT G. WAGNER.

Witnesses:
L. A. BECK,
H. E. BURDGE.